A. E. MUMMERT.
GRAIN BINDER.
APPLICATION FILED NOV. 2, 1917.
1,320,406.
Patented Nov. 4, 1919.
3 SHEETS—SHEET 3.
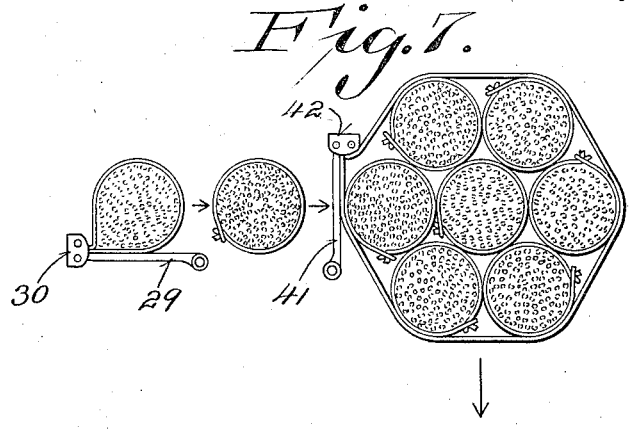
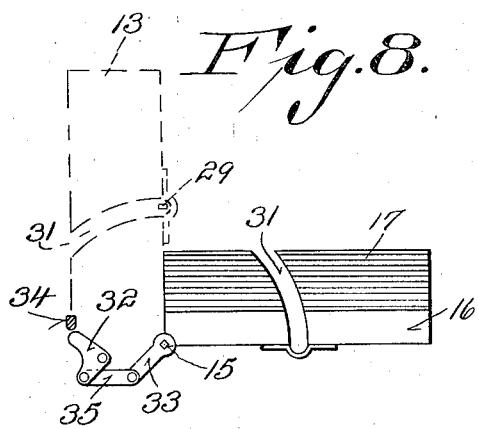
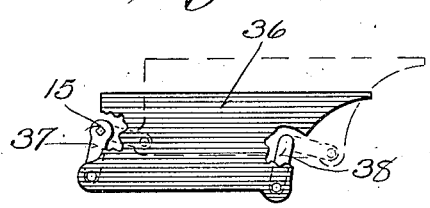
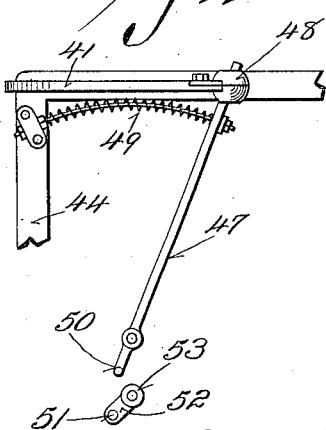

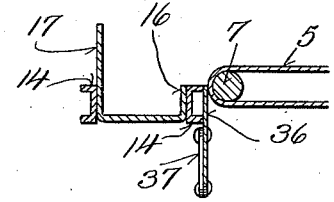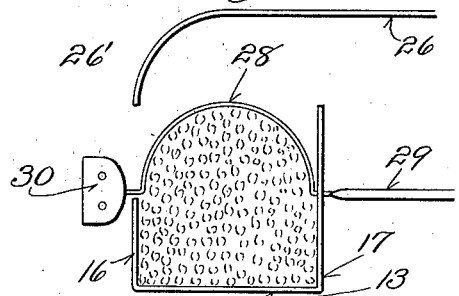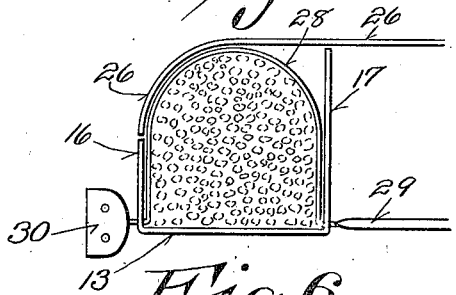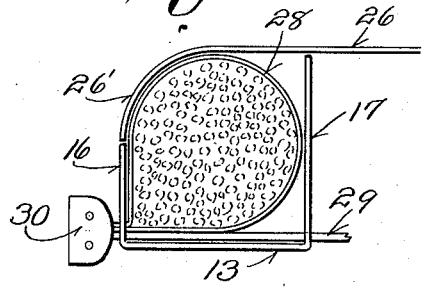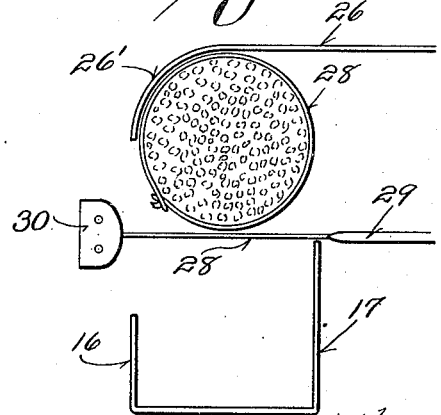

UNITED STATES PATENT OFFICE.

ARTHUR E. MUMMERT, OF MILWAUKEE, WISCONSIN.

GRAIN-BINDER.

1,320,406.  Specification of Letters Patent.  Patented Nov. 4, 1919.

Application filed November 2, 1917. Serial No. 199,864.

*To all whom it may concern:*

Be it known that I, ARTHUR E. MUMMERT, a citizen of the United States, and resident of Milwaukee, in the county of Milwaukee and State of Wisconsin, have invented certain new and useful Improvements in Grain-Binders; and I do hereby declare that the following is a full, clear, and exact description thereof.

My invention refers broadly to new and useful improvements in harvesting machines, and more particularly to grain binders.

The purpose of the present invention is to accomplish in a mechanical way that which has heretofore required the aid of human beings. That is to say under the usual circumstances after grain has been cut and formed into bundles either by machine or by hand it is further necessary for such bundles to be bound together in shocks when it is desirable to allow the cut grain to remain in the field for a time before being threshed. The present invention is designed to carry out these operations before the cut grain is deposited on the ground after having been initially received at one end of the machine.

In addition to the general object of the invention it is a less important object to provide an arrangement whereby a quantity of the cut grain stalks may be bound into a bundle after having been placed on end, thereby allowing the operations to be performed in a machine of much smaller size than would be possible if the bundles were formed in the ordinary manner.

With these and other objects in view the invention consists in certain novel features of construction, combination and arrangement of parts which will be hereinafter more particularly described and claimed and shown in the accompanying drawings wherein Figure 1 represents a plan view of a binder constructed in accordance with my invention, certain parts being removed and others shown in section to more clearly illustrate the machine;

Fig. 2 is a detailed sectional view taken on the plane of the line 2—2 of Fig. 1;

Figs. 3, 4, 5, 6 and 7 represent the several steps which take place in forming a number of cut grain stalks into a bundle and thereafter binding a number of bundles together into a shock;

Fig. 8 is a detailed sectional view showing particularly the means for disposing the cut grain stalks in a vertical or standing position;

Fig. 9 is a detail view of one of the binder needles;

Fig. 10 is an elevational view of an element which prevents the grain stalks from moving off the end of the initial receiving apron, and Fig. 11 is a plan view of the needle shown in Fig. 9 and certain associated parts.

Figure 1:
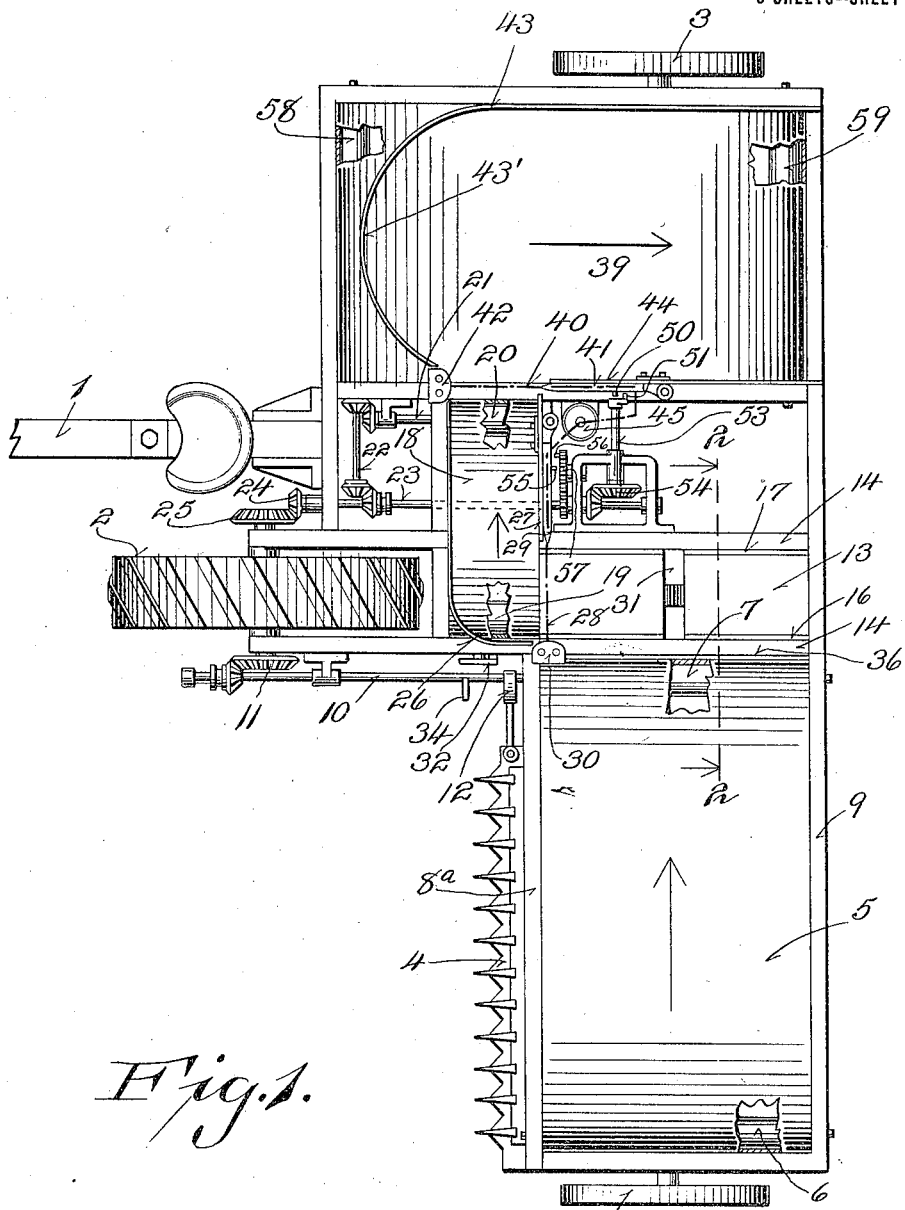

Although many old parts which are present in every binding machine are used in the present invention, yet these parts have been materially rearranged and associated with other new parts so that a practically entirely new machine has resulted. This may be moved over a grain field in any preferred manner, it being provided with a tongue 1 to which horses or a tractor may be connected, and the frame of the machine, which is formed of channel iron bars, is supported by the bull-wheel 2 and rear wheels 3. The bull-wheel in addition to supporting the front portion of the frame also provides the operating mechanism for the parts carried by the frame.

As the machine is propelled across a grain field reciprocating cutter bars 4 sever the stalks adjacent the ground and a reel, not shown, engages the same and causes them to be deposited on an initial receiving apron 5 which is in the form of an endless belt conveyer of appropriate width. The apron is disposed around rollers 6 and 7 which are journaled in bearings carried by front and rear bars 8ª and 9 of the machine frame. The axes of these rollers extend parallel with the plane of the direction of movement of the machine and therefore when they are rotated, the apron 5 will travel in a direction transverse of the direction of movement of the machine.

Any preferred means may be employed for rotating one or both of the rollers 6 and 7, but that employed in the present machine consists of a shaft 10 journally carried by the machine frame and extended parallel, and preferably in alinement, with the roller 7 to which it is connected, and a geared connection 11 between the shaft of the bull-wheel 2 and one end of the shaft 10. Thus as long as the bull-wheel continues to revolve the apron 5 moves to convey the cut grain stalks deposited thereon in one direction, this direction being as indicated by the arrow in Fig. 1. The same shaft 10 is also used to reciprocate the movable cutter bar, this being procured through a cam connection 12.

At the inner end of the apron 5 is a platform or tray 13 which is of a length substantially equal to the width of the apron and of appropriate width, this tray being designed to receive the cut grain stalks after they have dropped off the end of the apron. This tray is pivotally mounted between channel bars 14, it being secured to a shaft 15 at its forward end, whereby it may be moved to a vertical position as shown in dotted lines in Fig. 8. It will be understood from Figs. 1 and 8 that the tray is normally disposed in a horizontal position to receive the cut grain stalks which are in a similar position. The wall 16 of the tray adjacent the inner end of the apron is relatively narrow and its upper edge is normally positioned below the plane of the upper stretch of said apron as shown in Fig. 2. The other wall 17, however, is considerably wider than the wall 16 to prevent the grain stalks from being moved off of the tray.

As hereinbefore mentioned before the cut grain stalks are formed into sheaves they are placed on end or in a vertical position, this being carried out by the tray 13, said tray when in upright position causing the grain stalks carried thereby to stand on end upon a second endless continuously operative conveyer apron 18. This apron is considerably narrower than the apron 5, its width being substantially equal to the normal diameter of a bundle of grain stalks. Its direction of movement is substantially the same as that of the apron 5, as will appear from Fig. 1.

This second apron is also trained around rollers 19 and 20, the latter being revolved by the rotation of a shaft 21 with which it is connected. This shaft 21 is geared to a short shaft 22 that is similarly connected with a drive shaft 23. The forward end of this shaft is provided with a bevel gear 24 which meshes with a similar gear 25 carried by the end of the shaft of the bull-wheel.

The operation of forming a number of cut grain stalks into a sheaf will now be considered. From Fig. 1 it will be observed that the apron 18 provides in effect the bottom of a passageway which is formed by a guard 26 and a needle-supporting frame 27, the entrance into said passageway being closed by the tray 13 when the same is in its vertical position, said entrance-way being substantially at the side of the passage while the outlet therefrom is at the end and remote from the entrance. Twine 28 normally extends across the entrance-way from a needle 29 to a knotter 30. After the tray 13 receives a batch of grain stalks it is elevated to its vertical position, thereby carrying the grain stalks into upright posture, such movement in turn forcing the twine 28 into the passageway and over the conveyer 18 as shown in Figs. 3 and 4. The twine will thus be partially around the grain stalks which are to be tied to form a sheaf, the completion of the bundle being procured by the movement of the needle 29 across said entrance-way to the knotter 30 where a section of the twine is cut and knotted about the stalks to form a complete bundle, these steps being illustrated in Figs. 5 and 6. The needle 27 having accomplished its purpose, returns to its normal retracted position and the tray 13 drops to its horizontal position.

These operations are carried out with considerable rapidity and are repeated as often as a sufficient quantity of grain stalks is moved onto the tray 13. From Figs. 3 to 6 it will be noted that the walls 16 and 17 of the tray materially aid in forming the sheaf, further aid being rendered by the curved end 26' of the guard 26. When the tray is in its upright position the wall 17 extends completely across the passageway above referred to and the other wall 16 coöperates with the curved end 26 of the guard to completely close one end of said passageway. In order that the needle and twine may not be interfered with by the movement of the tray, the walls and bottom thereof are cut away as at 31.

One means for actuating the tray 13 to move it to its upright position is illustrated in Figs. 1 and 8. This means consists of a bell-crank 32, a crank 33 fixed to the shaft 15, and a finger 34 on the shaft 10 to intermittently engage one end of the bell-crank which in turn is linked as at 35 to the crank 33. The shaft 10 is continuously revolving and the finger therefore strikes the bell-crank at predetermined intervals, thus causing the movement of the tray 13.

It is obvious that inasmuch as the apron 5 is continuously moving some means is necessary to prevent the grain stalks from moving off the end thereof while the tray 13 is in vertical position. Therefore a stop-plate 36 is provided, this plate being adapted to intermittently rise above and sink below the level of the upper stretch of the conveyer 5, and is disposed at the inner end thereof. The two positions of the plate are illustrated in Fig. 10, the full line view showing the normal or inactive position, and the dotted line the elevated position. This plate is actuated by the same means which operate the tray 13, it being pivoted to a crank 37 carried by the shaft 15. This crank is pivoted at one end to the plate and the other end of the latter is linked to a suitable part of the machine frame by a link 38.

After a sheaf has been formed at one end of the conveyer 18 it is moved along in a standing position through the passageway until it reaches the end thereof which is at one side of a continuously operative third endless conveyer apron 39. The outlet of said passageway as well as its inlet is closed by a section of binder twine 40 which extends from a needle 41 to a knotter 42. One side and one end of the apron 39 are protected by a guard 43 having a curved end 43′, and the side of said conveyer opposite to the first mentioned side has a needle-supporting frame 44 disposed there-adjacent.

As the sheaf is moved off the end of the conveyer or apron 18 it forces the twine 20 outwardly and each succeeding sheaf as it is formed as above described forces said twine farther outwardly until a sufficient number of sheaves have been disposed on the apron 39 to form a shock. When this occurs suitable operating mechanism will project the needle across the outlet of the passageway formed by the guard 26 and the frame 27 to the knotter 42, whereupon the twine will be tightly bound around the plurality of sheaves, and then knotted and severed. This obviously forms a shock much more quickly and neatly than can be done by hand, and when once formed it is moved by the apron 39 to the rear of the machine where it is deposited in an upright position on the ground. After the formation of the shock is complete the needle 41 returns to its retracted position preparatory to again forming other sheaves into a shock in the same manner.

The twine feeding both needles 29 and 41 is carried in a twine box 45 mounted upon the machine frame. Both of the needles are operated substantially in the same manner and therefore a description of the operation of the needle 41 will be practically sufficient for both. In addition to Fig. 1, Figs. 9 and 11 illustrate the needle projecting and returning means. The needle 41 is held in a horizontal position and in sliding engagement with the frame 44, the latter being provided with a horizontal slot which receives a guide 46 projecting upon one side of the needle. The end of the needle remote from its active end is connected with a lever 47 by a universal, or ball-and-socket, joint 48 the lever being slidable in the ball of the joint. The lever is intermediately pivoted and the actuation of one end will obviously project the needle in one direction. The return of the needle to its normal position is procured by an expansile spring 49. The lever 47 is rocked by the engagement of coöperating fingers 50 and 51, the former being carried by one end of the lever and the latter by a crank 52 on one end of a shaft 53. This shaft 53 in turn is operated by the rotation of the shaft 23 it being connected therewith by bevel gears 54.

The lever of the needle 29 is similarly actuated by the engagement of fingers 55 and 56, but the last mentioned finger is carried by a crank-plate 57, the teeth of which are meshed with a gear on said shaft 23. All of these parts just described are proportioned so that the members which they are adapted to operate are timed to be actuated at proper intervals.

The apron 39 is caused to travel toward the rear of the machine by the rotation of a roller 58 fixed to the shaft 22. An additional roller 59 is also provided for the apron, these rollers 58 and 59 being arranged as the similar rollers for the other aprons 5 and 18.

The operation of the invention has probably already been ascertained from the description of the various parts, but briefly stated is as follows: Upon movement of the machine through a grain field, the cutter bars 4 will cut the grain, the stalks of which will fall rearwardly onto the continuously moving apron 5. Said apron conveys the grain stalks to the tray 13 which is in a horizontal position, and after a sufficient quantity has been received thereby said tray will be moved to its vertical position to stand the grain stalks on end, this movement of the tray being procured by wiping engagement of the finger 34 with the crank 32. Simultaneously with the upward movement of the tray the stop-plate 36 is raised to its dotted line position shown in Fig. 10 to retard the movement of the grain stalks on the apron 5 and prevent their being shoved off the end thereof by the continuously accumulating quantity received from the cutter bars.

While the tray is still in its upright position the quantity of grain stalks which have been stood on end by movement thereof will be bound into a sheaf, which bundle is conveyed, while still standing, to the apron 39. The tray returns to its horizontal position to receive an additional quantity of grain stalks when the stop-plate 36 is depressed. After a number of sheaves have been formed the shock-forming mechanism comes into operation and said sheaves are bound together into a shock, this binding operation being determined by engagement of the finger 51 on the shaft 53 with the finger 50 of the needle 41. When the completed shock has been dropped on end on the field the operation of the machine is completed.

From the foregoing description taken in connection with the accompanying drawings it will be obvious that an improved labor-saving machine has been devised, said machine doing away with the labor of several men which heretofore has been necessary for forming bundles of grain into shocks after they have been dropped by the binder. Various changes in the form and proportion of the several parts may be resorted to within the scope of the appended claims without departing from the principles of the invention.

I claim:

1. In a binder of the class described, a conveyer adapted to receive loose stalks in substantially horizontal position, means for cutting located directly at the forward side of the conveyer, means at one end of the conveyer for raising said stalks to vertical position and means for tying batches of said stalks together to form sheaves subsequent to operation of said stalk raising means.

2. In a binder of the class described, means for receiving cut grain stalks in horizontal position, means for standing said stalks on end, means for tying a number of said stalks together to form a bundle subsequent to operation of said means for standing the stalks on end, and means for forming a predetermined number of sheaves into shocks.

3. In a binder of the class described, means for initially receiving loose grain stalks in horizontal position, means for standing said stalks on end, and means for tying a number of said stalks together to form sheaves subsequent to operation of said means of standing said stalks on end.

4. In a binder of the class described, a conveyer adapted to receive loose stalks in substantially horizontal position, means at one end of the conveyer for collecting the stalks and intermittently raising collected batches of stalks on end and means for tying said stalks into sheaves when raised on end.

5. In a binder of the class described, a conveyer for moving cut grain stalks in one direction, a cutter bar at the forward side of the conveyer, means for collecting a number of stalks into a batch, means for tying batches of stalks into sheaves, means for intermittently transferring the stalks from the collecting means to the sheaf tying means, and means to prevent stalks from moving from the end of the conveyer during the intermittent operation of the transferring means.

6. In a binder of the class described, a conveyer for moving cut grain stalks in one direction, a cutter bar at the forward side of the conveyer, means for tying a number of stalks into a sheaf, a platform normally disposed at the end of the conveyer to receive grain stalks therefrom, said platform being movable away from the conveyer to shift the stalks from the same to the sheaf tying means, and a member movable across the end of the conveyer when the platform is moved away therefrom.

7. In a binder of the class described, a conveyer for moving cut grain stalks in one direction, a cutter bar at the forward side of the conveyer, means for tying a number of stalks into a sheaf, a platform normally disposed at the end of the conveyer to receive grain stalks therefrom, said platform being movable away from the conveyer to shift the stalks from the same to the sheaf tying means, a plate normally disposed below the level of the conveyer at the end thereof, and means for moving the plate above the conveyer when the tray is moved away therefrom.

8. In a binder of the class described, a conveyer for moving loose cut grain stalks in one direction, means for tying a number of stalks into a sheaf, a pivoted tray normally disposed in horizontal position at the end of the conveyer to receive grain stalks therefrom, and means for moving the tray into vertical position to transfer said grain stalks therefrom to the sheaf tying means.

9. In a binder of the class described, a conveyer for moving loose cut grain stalks in one direction, means for tying a number of said stalks into a sheaf, a pivoted tray normally disposed in horizontal position at the end of the conveyer to receive grain stalks therefrom, means for moving the tray into vertical position to transfer said grain stalks therefrom to the sheaf tying means, and means for actuating the sheaf tying means when said tray is in vertical position.

10. In a binder of the class described, means for initially receiving loose cut grain stalks and moving the same in one direction, a normally horizontally disposed tray for receiving the grain stalks from said initial receiving means, means for moving said tray into vertical position to stand said stalks on end, and means coöperating with said tray for forming the upright stalks into a sheaf.

11. In a binder of the class described, means for initially receiving cut grain stalks, means for tying a number of said stalks into a sheaf, including a passageway, a tray movable into the entrance of said passageway to transfer stalks from the initial receiving means thereto, the side walls of said tray having a transverse slot, and a binding member movable across said entrance-way through the slots in the tray when the latter is in one position.

12. In a binder of the class described, a conveyer movable in one direction, a pivoted tray disposed at the end of the conveyer transversely of the direction of movement thereof, the wall of the same adjacent the conveyer being below the surface of the latter, the other wall being above said surface to prevent the stalks from moving beyond said tray, a second conveyer, means for moving the tray on its pivot to slide the stalks received thereby onto said second conveyer, and means for tying said stalks into a sheaf.

13. In a binder of the class described, a conveyer adapted to receive stalks in horizontal position, a member movably mounted at one end of the conveyer to collect stalks discharged therefrom, means for standing said stalks on end, means for tying batches of stalks into sheaves when stood on end, means for collecting said sheaves into shocks in standing position and means for discharging said shocks.

14. In a binder of the class described, a conveyer adapted to receive loose stalks in a horizontal position, a member disposed at one end of the conveyer to collect stalks discharged therefrom, said member being pivoted at one end, means for swinging said member to stand said stalks on end, a knotter at one side of said member and a needle at the other side of said member for coöperation with said knotter and movable across the path of said bundles carried by the member in raising movement.

15. In a binder of the class described, a conveyer adapted to receive loose stalks in horizontal position, a tray disposed at one end of the conveyer to collect stalks therefrom, upstanding walls on the tray, said tray being pivoted at one end, means for raising the tray to stand said stalks on end, a knotter disposed at one side of the pivoted end of the tray, a needle normally disposed at the other side of the pivoted end of the tray and reciprocal across the path of sheaves carried by the tray in lifting movement, the walls of said tray being provided with slots for permitting such movement of the sheaves.

16. In a binder of the class described, a conveyer adapted to receive cut grain stalks in horizontal position, means at one end of the conveyer for collecting the stalks and standing them on end, means for tying said stalks into sheaves, a conveyer extending from said bundle forming means, a knotter at one side of the conveyer, a needle normally disposed at the other side of the discharge end of the conveyer and movable across the path of sheaves carried on the conveyer for co-action with said knotter, and means for operating said needle at intermittent intervals.

In testimony that I claim the foregoing I have hereunto set my hand at Milwaukee, in the county of Milwaukee and State of Wisconsin.

ARTHUR E. MUMMERT.

Copies of this patent may be obtained for five cents each, by addressing the "Commissioner of Patents. Washington, D. C."